(12) United States Patent
Yanagioka (10) Patent No.: US 9,109,098 B2
(45) Date of Patent: Aug. 18, 2015

(54) CARBON BLACK, RUBBER COMPOSITION AND PNEUMATIC TIRE

(75) Inventor: Masaki Yanagioka, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/235,162

(22) PCT Filed: Jul. 26, 2012

(86) PCT No.: PCT/JP2012/068995
§ 371 (c)(1),
(2), (4) Date: Apr. 1, 2014

(87) PCT Pub. No.: WO2013/015368
PCT Pub. Date: Jan. 31, 2013

(65) Prior Publication Data
US 2014/0228502 A1    Aug. 14, 2014

(30) Foreign Application Priority Data
Jul. 28, 2011  (JP) .................................. 2011-165908

(51) Int. Cl.
C08K 3/04     (2006.01)
B60C 1/00     (2006.01)
C09C 1/48     (2006.01)

(52) U.S. Cl.
CPC ............... *C08K 3/04* (2013.01); *B60C 1/0016* (2013.04); *C09C 1/48* (2013.01); *C01P 2006/19* (2013.01); *C01P 2006/22* (2013.01); *Y10T 428/2982* (2015.01)

(58) Field of Classification Search
USPC .......................................................... 524/496
See application file for complete search history.

(56) References Cited

U.S. PATENT DOCUMENTS

| | | | |
|---|---|---|---|
| 5,430,088 A * | 7/1995 | Ohashi et al. | ................. 524/496 |
| 5,484,836 A | 1/1996 | Kikuchi et al. | |
| 5,516,833 A | 5/1996 | Ohashi et al. | |
| 6,197,870 B1 * | 3/2001 | Sakakibara | ................. 524/496 |
| 2007/0197715 A1 | 8/2007 | Yanagioka | |
| 2008/0271831 A1 | 11/2008 | Chauvin | |
| 2009/0030135 A1 | 1/2009 | Fujisawa | |

FOREIGN PATENT DOCUMENTS

| | | | | |
|---|---|---|---|---|
| CN | 1950442 A | 4/2007 | | |
| CN | 1961034 A | 5/2007 | | |
| CN | 101353450 A | 1/2009 | | |
| EP | 0608892 A1 | 8/1994 | | |
| JP | 06093137 A | * 4/1994 | .............. | C08L 21/00 |
| JP | H06-093137 A | 4/1994 | | |
| JP | 06-136288 A | 5/1994 | | |
| JP | 06-184364 A | 7/1994 | | |
| JP | 07041600 A | * 2/1995 | ................ | C08L 9/00 |
| JP | H07-041600 A | 2/1995 | | |
| JP | 2000-080302 A | 3/2000 | | |
| JP | 2003-096332 A | 4/2003 | | |
| JP | 2003096332 A | * 4/2003 | ................ | C09C 1/48 |
| JP | 2004-307619 A | 11/2004 | | |
| JP | 2005-008877 A | 1/2005 | | |
| JP | 2011-084696 A | 4/2011 | | |
| JP | 2011084696 A | * 4/2011 | | |

OTHER PUBLICATIONS

Translation of JP06-093137, Apr. 5, 1994.*
Translation of JP 07-041600, Feb. 10, 1995.*
Translation of JP 2003-096332, Apr. 3, 2003.*
Translation of JP 2011-084696, Apr. 28, 2011.*
Office Action issued Nov. 2, 2014 in corresponding Chinese Patent Application No. 201280037812.2.
Chinese Office Action issued in corresponding CN Application No. 201280037812.2, dated May 27, 2015.

* cited by examiner

*Primary Examiner* — Hui Chin
(74) *Attorney, Agent, or Firm* — Sughrue Mion, PLLC (57) ABSTRACT

The present invention provides carbon black, the standard deviation σ of aggregate size distribution of which is obtained by a light scattering method using an ultraviolet ray, the standard deviation σ satisfying the expression (1): $\sigma < -48.7 \times (24M4DBP/D_{st}) + 161.8$ (1). In the expression (1), 24M4DBP represents the dibutyl phthalate absorption number (cm³/100 g) of compressed sample, and $D_{st}$ (nm) is a Stokes' equivalent diameter providing the mode in aggregate size distribution obtained by a centrifugal sedimentation method. The carbon black can improve both the abrasion resistance and the low rolling resistance of a tire. The present invention also provides a rubber composition mixed with this carbon black, and a pneumatic tire including a tread part formed by using this rubber composition.

4 Claims, 4 Drawing Sheets

CARBON BLACK, RUBBER COMPOSITION AND PNEUMATIC TIRE

CROSS REFERENCE TO RELATED APPLICATIONS

This application is a National Stage of International Application No. PCT/JP2012/068995 filed Jul. 26, 2012, claiming priority based on Japanese Patent Application No. 2011-165908 filed Jul. 28, 2011, the contents of all of which are incorporated herein by reference in their entirety.

BACKGROUND OF THE INVENTION

The present invention relates to a carbon black suitably mixed in the tread part of a tire, a rubber composition mixed with this carbon black, and a pneumatic tire including a tread part formed by using this rubber composition.

RELATED ART

Conventionally, in order to improve the abrasion resistance of a tire, methods of increasing the specific surface area of carbon black mixed in the rubber composition of a tire, the mixing ratio, and the structure are carried out. However, these methods cause the rolling resistance of a tire to increase. Moreover, when the structure is increased, the viscosity of the unvulcanized rubber of a rubber composition mixed with carbon black increases to deteriorate the processability. On the other hand, in order to decrease the rolling resistance of a tire, methods of decreasing the specific surface area of carbon black mixed with the rubber of a tire and the mixing ratio. However, these methods cause the abrasion resistance of the tire to decrease.

Thus, the abrasion resistance and the low rolling resistance are known to stay in an antinomic relation.

To improve both the abrasion resistances and the low rolling resistance that stay in an antinomic relation, various proposals have been made, one of which pays attention to the aggregate size distribution of carbon black.

For example, Claim 1 of Patent document 1 describes that the ratio $\Delta D_{50}/D_{st}$ between the half-value breadth $\Delta D_{50}$ and the mode $D_{st}$ of the aggregate size distribution of carbon black is 0.50 to 0.80. Claim 1 of Patent document 2 describes that the ratio $\Delta D_{st}/D_{st}$ between the modal diameter $D_{st}$ and the half-value breadth $\Delta D_{st}$ of carbon black aggregate is 0.80 or less. Claim 1 of Patent document 3 describes that the half-value breadth $\Delta D_{st}$ of the aggregate size distribution of carbon black is 70 nm or less.

In these patent documents 1 to 3, the aggregate size distribution of carbon black is measured by a centrifugal sedimentation method.

Patent Document 1: JP 6-184364A
Patent Document 2: JP 2000-080302A
Patent Document 3: JP 2004-307619A

DISCLOSURE OF THE INVENTION

Recently, from the viewpoint of environmental protection and economic efficiency, carbon black capable of further improving the abrasion resistance and the low rolling resistance has been strongly demanded without the processability of a rubber composition being impaired.

An objective of the present invention is to provide carbon black capable of further improving both the abrasion resistance and the low rolling resistance of a tire, a rubber composition mixed with this carbon black, and a pneumatic tire including a tread part formed by using this rubber composition.

As the result of intensive studies by the present inventors to achieve the above objective, they found that newly employing a light scattering method as a measurement means of the aggregate size distribution of carbon black as substitute for a centrifugal sedimentation method in the same manner as Patent documents 1 to 3 and specifying the aggregate-size distribution measured by this light-scattering method can improve both the abrasion resistance and the low rolling resistance without impairing the processability of a rubber composition.

As the measuring method of evaluating submicron-size aggregate such as carbon black aggregate, a light transmission method, a light scattering method, an X-ray scattering method, and a fluid dynamics fractionation method have been in practical use in addition to a widely-used centrifugal sedimentation method. However, the particle size determined from data detected from the diffraction scattering light generated by a laser source emitting a ultraviolet ray used in the present invention has the implication of sphere-equivalent diameter (volume distribution), which is different from Stokes' equivalent diameter (weight distribution) obtained by a centrifugal sedimentation method.

The present invention provides the following [1] to [3].

[1] Carbon black, the standard deviation σ of aggregate size distribution of which is obtained by a light scattering method using an ultraviolet ray, the standard deviation σ satisfying the expression (1).

$$\sigma < -48.7 \times (24M4DBP/D_{st}) + 161.8 \quad (1)$$

In the expression (1), 24M4 DBP represents the dibutyl phthalate absorption number (cm³/100 g) of compressed sample, and $D_{st}$ (nm) is a Stokes' equivalent diameter providing the mode in aggregate size distribution obtained by a centrifugal sedimentation method.

[2] A rubber composition includes 5 to 200 parts by mass of the carbon black according to [1] mixed based on 100 parts by mass of rubber component.

[3] A pneumatic tire formed by using the rubber composition according to [2].

According to the present invention, both the abrasion resistance and the low rolling resistance can be improved without the processability of a rubber composition being impaired.

MODES FOR CARRYING OUT THE INVENTION

The present invention will be explained in detail below.

Carbon Black

In the carbon black of the present invention, the standard deviation σ of aggregate size distribution is obtained by a dynamic light scattering method using an ultraviolet ray and satisfies the expression (1).

$$\sigma < -48.7 \times (24M4DBP/D_{st}) + 161.8 \quad (1)$$

In the expression (1), 24M4 DBP represents the dibutyl phthalate absorption number (cm³/100 g) of compressed sample, and $D_{st}$ (nm) represents a Stokes' equivalent diameter providing the mode in aggregate size distribution obtained by a centrifugal sedimentation method.

In the present invention, the aggregate size distribution of carbon black means aggregate size distribution on volumetric basis.

Light Scattering Method

The present invention employs a light scattering method using an ultraviolet ray as substitute for a conventional centrifugal sedimentation method as the measuring method of aggregate size distribution. Specifying the aggregate size distribution by using a light scattering method using an ultraviolet ray can provide a tire with both excellent abrasion resistance and excellent low rolling resistance.

In a conventional centrifugal sedimentation method, a large size carbon black aggregate was not sufficiently detectable. Thus, in a tire formed by using carbon black measured by a centrifugal sedimentation method, it is considered that excessively large carbon black aggregate hardly detected by a centrifugal sedimentation method was mixed and then acted as a rupture nucleus of rubber due to its size to cause the abrasion resistance to decrease.

In contrast to a centrifugal sedimentation method, a light scattering method using an ultraviolet ray can determine a larger aggregate size. Therefore, specifying the standard deviation σ of the aggregate size distribution by using a light scattering method using an ultraviolet ray as described later can provide a tire with both excellent abrasion resistance and excellent low rolling resistance.

The wavelength of the ultraviolet ray in a light scattering method is not limited in particular and may be selected appropriately according to the aggregate size distribution. The examples described later use a wavelength of 375 nm.

24M4 DBP

The 24M4 DBP absorbed amount (cm³/100 g) is determined by measuring a DBP (dibutyl phthalate) absorbed amount after applying a pressure of 24,000 psi 4 times, in accordance with ISO 6894. This 24M4 DBP absorbed amount is an index for evaluating the specification of the skeletal structure of carbon black mainly formed of the first-order structure used when an DBP absorbed amount due to deformative and destructive structure morphology (second-order structure) caused by so-called van der Waals force is eliminated and then the DBP absorbed amount based on indestructive true structure morphology (first-order structure) is determined.

The 24M4 DBP absorbed amount is more than 106 cm³/100 g. The 24M4 DBP absorbed amount of more than 106 cm³/100 g increases the force of reinforcing rubber to improve the abrasion resistance. The 24M4 DBP absorbed amount is less than 150 cm³/100 g. The 24M4 DBP absorbed amount of less than 150 cm³/100 g decreases the fuel consumption and further decreases the viscosity of unvulcanized rubber to improve the processability in factories. From this viewpoint, the 24M4 DBP absorbed amount is more preferably 106 to 130 cm³/100 g, further more preferably 106 to 120 cm³/100 g.

$D_{st}$ $D_{st}$ is an aggregate size providing the mode of aggregate size distribution obtained by using the centrifugal sedimentation method according to the method described in JIS K6217-6, which is referred to as Stokes' diameter. This $D_{st}$ is defined as the average diameter of carbon black aggregate.

The $D_{st}$ is preferably less than 115 nm. The $D_{st}$ of less than 115 nm prevents large carbon black aggregate from acting as a rupture nucleus of rubber due to its size to improve the abrasion resistance. The $D_{st}$ is also preferably more than 20 nm. The $D_{st}$ of more than 20 nm facilitates the production. From this viewpoint, the $D_{st}$ is more preferably more than 20 nm and less than 96 nm.

24M4 DBP/$D_{st}$

The 24M4 DBP/$D_{st}$ is a factor indicating the particle property of carbon black. As described above, since the 24M4 DBP absorbed amount (cm³/100 g) is an index indicating the size of the structure of carbon black, dividing this 24M4 DBP absorbed amount (cm³/100 g) by the average diameter $D_{st}$ (nm) of aggregate provides an index indicating the development of the structure per aggregate diameter. As this value (24M4 DBP/$D_{st}$) increases, the structure is developed well. This shows an effect in increasing the abrasion resistance per certain modulus of a rubber composition.

The 24M4 DBP/$D_{st}$ is preferably 1.1<24M4 DBP/$D_{st}$<1.7. The 24M4 DBP/$D_{st}$ of more than 1.1 increases the abrasion resistance per certain modulus of the rubber composition. The 24M4 DBP/$D_{st}$ of less than 1.7 prevents the structure from being excessively developed to narrow the particle size distribution. From this viewpoint, 24M4 DBP/$D_{st}$ is more preferably 1.2<24M4 DBP/$D_{st}$<1.6, further more preferably 1.3<24M4DBP/$D_{st}$<1.5.

Standard Deviation σ

In the present invention, the standard deviation σ of aggregate size distribution of carbon black is obtained by a light scattering method using an ultraviolet ray and satisfies the above-mentioned expression (1).

If the standard deviation σ does not satisfy the range of the expression (1), the processability deteriorates, and neither the abrasion resistance nor the low rolling resistance are improved. Thus, adjusting the 24M4 DBP absorbed amount and the aggregate size distribution to satisfy the expression (1) can provide desired properties (i.e., high processability, abrasion resistance, and low rolling resistance) to produce carbon black. Therefore, this expression (1) is an important index for producing carbon black with the above-mentioned properties.

From this viewpoint, the standard deviation σ is preferably the following expression.

$$\sigma \leq -48.7 \times (24M4DBP/D_{st}) + 157.7 \quad (2)$$

CTAB Specific Surface Area

CTAB is a cetyl trimethyl ammonium bromide. Generally, a nitrogen adsorption method is used for measuring the specific surface area of carbon black, which is an excellent evaluation method. A certain kind of carbon black has a pore with a size of several angstroms at apart with a large surface area. Rubber cannot enter this pore. Then, the specific surface area having a pore to which rubber can enter can be evaluated by using a large admolecule. One of the large admolecules is CTAB. Therefore, the CTAB specific surface area is employed for evaluating of the specific surface area having a pore to which rubber can enter. This CTAB specific surface area is measured in accordance with ISO 6810 and expressed in $m^2/g$.

The CTAB specific surface area is preferably 30<CTAB specific surface area $(m^2/g)$<150. The CTAB specific surface area falling within this range can improve the abrasion resistance and the low rolling resistance. Moreover, the CTAB specific surface area of more than 30 improves the abrasion resistance of a rubber composition. The CTAB specific surface area of less than 150 increases the viscosity while rubber is blended to prevent the processability from decreasing. From this viewpoint, 55<CTAB specific surface area<120 is more preferable, and 70<CTAB specific surface area<105 is further more preferable.

$\Delta D_{50}$ $\Delta D_{50}$ (nm) is the breadth of distribution when the frequency is half of the maximum height in an aggregate size distribution curve obtained by a centrifugal sedimentation method.

The $\Delta D_{50}$ is preferably less than 100 nm. The $\Delta D_{50}$ of less than 100 nm improves the abrasion resistance. The $\Delta D_{50}$ of more than 20 nm improves the manufacturability. From this viewpoint, the $\Delta D_{50}$ is more preferably 20<$\Delta D_{50}$<75, further more preferably 20<$\Delta D_{50}$<58.

The half-value breadth $\Delta D_{50}$ (nm) of the peak including the $D_{st}$ of the aggregate size distribution and the $D_{st}$ (nm) are preferably $\Delta D_{50}$<100 and $D_{st}$<115 respectively from the viewpoint of further improving the abrasion resistance.

Production Process of Carbon Black

The production process of carbon black will be explained below.

An inside of the carbon black production furnace is of a structure in which a combustion zone, a reaction zone and a reaction-stopping zone are continuously provided, and a whole part thereof is covered with a refractory.

The carbon black production furnace is equipped with a combustible fluid-introducing chamber as the combustion zone, a cylinder for introducing an oxygen-containing gas in which an oxygen-containing gas introduced from an outer circumference of a furnace head part through an oxygen-containing gas-introducing tube is straightened by means of a current plate and introduced into the combustible fluid-introducing chamber and a fuel oil-spraying device introducing tube which is installed in a central axis of the cylinder for introducing an oxygen-containing gas and which introduces hydrocarbon for a fuel into the combustible fluid-introducing chamber. A high temperature combustion gas is produced in the combustion zone by combustion of the hydrocarbon for a fuel.

The carbon black production furnace is equipped with a converging chamber as the reaction zone in which the cylinder converges gradually, a feedstock-introducing chamber having, for example, four feedstock-spraying ports at a downstream side of the converging chamber and a reaction chamber at a downstream side of the feedstock-introducing chamber. A hydrocarbon feedstock is sprayed and introduced through the feedstock-spraying ports into a high temperature combustion gas stream coming from the combustion zone. The hydrocarbon feedstock is sprayed and introduced into the high temperature combustion gas stream in the reaction zone to convert the hydrocarbon feedstock into carbon black by incomplete combustion or thermal decomposition reaction.

Figure 1:
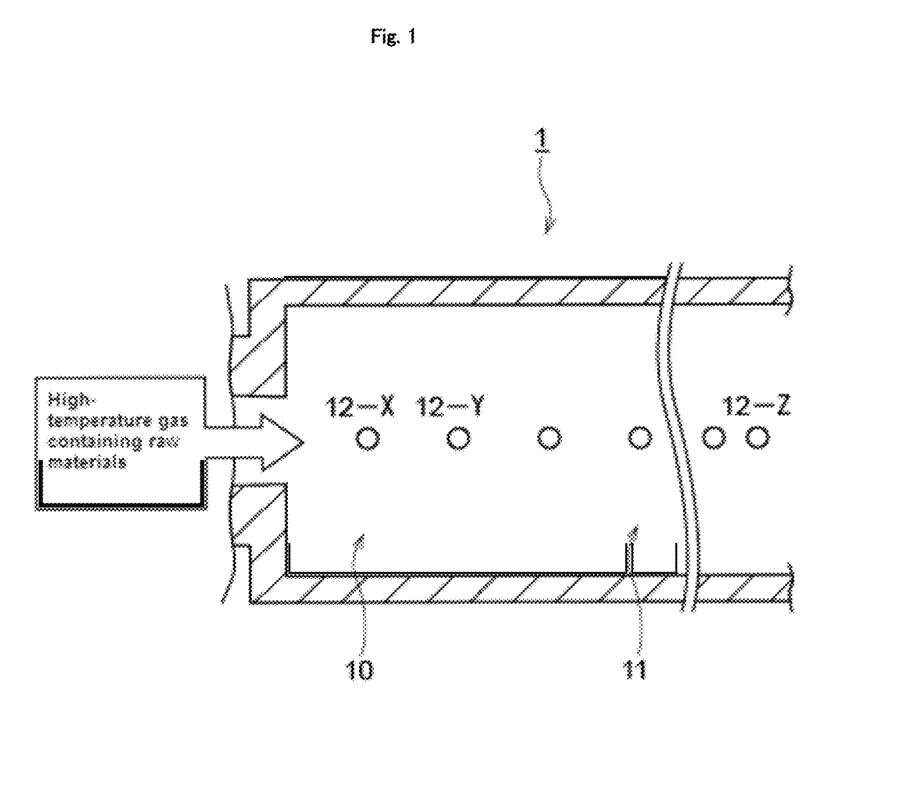
FIG. 1 shows a partial longitudinal front explanatory drawing of one example of a carbon black production furnace for producing the carbon black for blending with rubber.

FIG. 1 is a partial longitudinal front explanatory drawing of one example of the above carbon black production furnace for producing the above carbon black for blending with rubber, and it shows a reaction chamber 10 into which a high temperature gas containing a feedstock (hydrocarbon feedstock) for carbon black is introduced and a reaction continuing-cum-cooling chamber 11. As shown in FIG. 1, the carbon black production furnace 1 is equipped with the reaction continuing-cum-cooling chamber 11 having a multistage quenching medium-introducing means 12 (12-X, 12-Y, 12-Z) as the reaction-stopping zone. The multistage quenching medium-introducing means 12 sprays a quenching medium such as water and the kike onto the high temperature combustion gas stream coming from the combustion zone. The high temperature combustion gas stream is quenched by the quenching medium in the reaction-stopping zone to terminate the reaction.

Further, the carbon black production furnace 1 may be equipped with a device for introducing a gaseous substance in the reaction zone or the reaction-stopping zone. In this connection, a mixture of air, oxygen and hydrocarbon, a combustion gas obtained by combustion reaction thereof and the like can be used as the "gaseous substance."

Thus, an average reaction temperature and a retention time in the respective zones through which the reaction gas stream passes until it goes into the reaction-stopping zone are controlled in production of the carbon black to obtain carbon black for blending with rubber which is used for the rubber composition of the present invention.

In this regard, the respective zones will be explained.

The combustion zone is a region in which a high temperature gas stream is produced by reaction of a fuel and air, and a downstream end thereof shows a point in which the feedstock is introduced into the reaction equipment (when introduced in the plural positions, an uppermost stream side), for example, an upper stream side (left side in FIG. 1) than a point in which the feedstock is introduced.

Further, the reaction zone shows a zone from a point in which the hydrocarbon feedstock is introduced (when introduced in the plural positions, an uppermost stream side) up to a point in which the multistage quenching water-spraying means 12 (these means are freely taken out and put in the reaction continuing-cum-cooling chamber 11, and use positions thereof are selected according to the kind of the products produced and the characteristics thereof) in the reaction continuing-cum-cooling chamber 11 work (introducing a refrigerant such as water and the like). That is, in a case where the feedstock is introduced, for example, in the third feedstock-spraying port and where water is introduced in the multistage quenching medium-introducing means 12, a region between them is the reaction zone. The reaction-stopping zone shows a zone present at a lower side (right side in FIG. 1) than the point in which the quenching water-pressing and spraying means is allowed to work.

The term of the reaction continuing-cum-cooling chamber 11 is used in FIG. 1 because of the following reasons; a zone from the point in which the feedstock is introduced up to the point in which the quenching water-pressing and spraying means for stopping the reaction works is the reaction zone, and a zone following it is the reaction-stopping zone; and the above quenching water-introducing position moves in a certain case according to performances required to the carbon black.

Rubber Composition

The rubber composition of the present invention includes 5 to 200 parts by mass of the carbon black mixed based on 100 parts by mass of a rubber component.

The rubber composition of the present invention will be explained below.

Rubber Component

The rubber component is not limited in particular but includes a natural rubber (NR), an isoprene rubber (IR), a styrene-butadiene copolymer (SBR), and a polybutadiene rubber (BR) from the viewpoint of achieving both abrasion resistance and low rolling resistance.

Carbon Black

The above-mentioned carbon black is used. This carbon black is preferably contained in 5 to 200 parts by mass based on 100 parts by mass of the rubber component. The content of the carbon black falling within this range can improve both the abrasion resistance and the low rolling resistance. Moreover, the content of 200 parts by mass or less decreases the hardness of the rubber composition to improve the processability.

Other Components

Other components contained in the rubber composition are appropriately selected and used as long as the objective of the present invention is not impaired. For example, these components include inorganic filler, softener, and vulcanizers such as sulfur; a vulcanization accelerator such as dibenzothiazyl disulfide; a vulcanization auxiliary agent; anti-aging agents; N-cyclohexyl-2-benzothiazyl-sulfenamide and N-oxydiethylene-benzothiazyl-sulfenamide; additives such as zinc oxide, stearic acid, an antiozonant, a colorant, an antistat, a lubricant, an antioxidant, a softener, a coupling agent, a foaming agent, and a foaming auxiliary agent; and various compounding agents typically used in the rubber industry. Commercially available products can suitably be used for these components.

Production of Rubber Composition

The rubber composition according to the present invention can be produced by, for example, kneading a rubber component, carbon black, and optionally an appropriately selected component, warming the kneaded product, extruding the warmed product, and vulcanizing the extruded product.

Conditions of the kneading are not limited in particular. Various conditions such as the volume introduced in a kneading device, the rotation rate of the rotor, and the ram pressure, the kneading temperature, the kneading time, and the type of the kneading device can be selected appropriately according to the purpose. The kneading device includes, for example, a Banbury mixer, an internalmixer, and a kneader which are typically used for kneading a rubber composition.

Conditions of the warming are not limited in particular. Various conditions such as the warming temperature, the warming time, and the warming device can be selected appropriately according to the purpose. The warming device includes, for example, a mixing mill typically used for warming a rubber composition.

Conditions of the extruding are not limited in particular. Various conditions such as the extrusion time, the extrusion rate, the extruding device, and the extrusion temperature can be selected appropriately according to the purpose. The extruding device includes, for example, an extruder typically used for extruding a rubber composition for a tire. The extrusion temperature can be appropriately determined.

In the extrusion, processability improvers including plasticizers such as aroma oil, naphthene oil, paraffinic oil, and ester oil; and liquid polymers such as liquid polyisoprene rubber and liquid polybutadiene rubber can be appropriately added in the rubber composition in order to control the liquidity of the rubber composition. In this case, the viscosity before the rubber composition is vulcanized can be decreased to improve the liquidity for extremely excellent extrusion.

The device, the method, and the conditions that are used for the vulcanization are not limited in particular and can be selected appropriately according to the purpose. The vulcanizing device includes, for example, a molding vulcanizing machine typically used for vulcanizing a rubber composition for a tire. As the conditions of the vulcanization, the temperature is typically about 100 to 190° C.

Pneumatic Tire

In the pneumatic tire of the present invention, the above-mentioned composition is applied to the tread part and the like. Using the above-mentioned rubber composition for the tread part can improve both the abrasion resistance and the low rolling resistance without impairing the processability. This pneumatic tire has a conventional structure without any particular limitation, which can be produced by a typical method. Gas for inflating the tire of the present invention includes air, air with an adjusted oxygen partial pressure, and an inert gas such as nitrogen, argon, and helium.

One example of the pneumatic tire suitably includes a pneumatic tire provided with a pair of bead parts, a carcass lying in a toroidal shape on the bead parts, a belt tightening a crown part of the carcass which forms the toroidal shape, and a tread. The pneumatic tire of the present invention may have a radial structure or may have a bias structure.

The structure of the tread is not limited in particular, which may be single-layer structure, may be a multi-layer structure, or may be a so-called cap/base structure formed from a cap part in the upper layer holding the road and a base part in the lower layer located adjacent to the pneumatic tire inside of this cap part. In the present invention, at least the cap part is preferably formed of the rubber composition of the present invention.

The method of producing the pneumatic tire of the present invention is not limited in particular. For example, the pneumatic tire of the present invention can be produced as follows. Specifically, the rubber composition of the present invention is first prepared. This rubber composition is applied to an unvulcanized base part previously applied to the crown part of a pneumatic tire case. Then, the pneumatic tire can be produced by molding and vulcanizing the rubber composition at a predetermined temperature under a predetermined pressure with a predetermined mold.

The pneumatic tire of the present invention can particularly be used not only so-called passenger cars but also tracks, buses, cars for off the road and cars for competitions such as racing cars.

EXAMPLES

The present invention will be described in more detail with reference to the examples below, but the present invention is not limited to the examples.

Various properties of the carbon black were evaluated by the following measuring methods.

(1) Aggregate Size Distribution (Light Scattering Method)

As the measuring device, a laser diffraction particle size distribution analyzer "SALD7100" (available from Shimadzu Corporation, wave length of ultraviolet ray laser: 375 nm) was used.

0.8 to 1.2 mass % of carbon black was added in 25 volume % of aqueous ethanol solution in which a small amount of surfactant was previously added. The solution was completely dispersed after subjected to ultrasonication (½-inch oscillation chip, output power: 50 W) to obtain a dispersion liquid.

This dispersion liquid is added in the cell of the laser diffraction particle size distribution analyzer. The volumetric particle size distribution (aggregate size distribution) was measured by a light scattering method. The standard deviation σ (nm) was obtained from this volumetric particle size distribution. The solution was stirred by using a stirrer come with the SALD7100 so as not to prevent carbon black from precipitating at the bottom of the cell during the measurement.

(2) Aggregate Size Distribution (Centrifugal Sedimentation Method)

As the measuring device, a disk centrifuge photosedimentometer (DCP) "BI-DCP Particle sizer" (available from Brookhaven) was used. The measurement was conducted in accordance with ISO/CD 15825-3 as follows.

0.05 to 0.1 mass % of carbon black was added in 25 volume % of aqueous ethanol solution in which a small amount of surfactant was previously added. The solution was completely dispersed after subjected to ultrasonication (½-inch oscillation chip, output: 50 W) to obtain a dispersion liquid. The rotation rate of the rotation disk in which 17.5 ml of distilled water were added as precipitation liquid (spin liquid) was set to 8,000 rpm. Then, 0.02 to 0.03 ml of the above-mentioned dispersion liquid was added. At the time of the addition of the dispersion liquid, a recorder was started. The amount of the carbon black aggregate passing a certain point adjacent to the outer periphery of the rotation disk due to the precipitation was optically measured. Then, the absorbance (frequency) was recorded as a continuous curve to time. The precipitation time was converted to a Stokes' equivalent diameter d according to the following Stokes' formula (3) to obtain a curve corresponding to the Stokes' equivalent diameter of the aggregate and the frequency.

$$d = K\sqrt{t} \quad (3)$$

In the above-mentioned formula (3), d is the Stokes' equivalent diameter (nm) of carbon black aggregate passing the optical measurement point of the rotation disk t minutes after precipitation onset. The constant K is determined by the temperature and the viscosity of the spin liquid, the difference in density of the carbon black and the spin liquid at the time of measurement (the true density of the carbon black was set to 1.86 g/cm$^3$), and the rotation rate of the rotation disk. In the examples and the comparative examples, since 17.5 ml of distilled water were used as spin liquid, and the measurement temperature and the rotation rate of the disk were set to 23.5° C. and 8,000 rpm, respectively, the constant K comes to 261.75.

Based on this measurement result, the mode diameter $D_{st}$ (nm), the half-value breadth $\Delta D_{50}$ (nm), and the standard deviation σ' (nm) were determined. The definition of the mode diameter $D_{st}$ and the half-value breadth $\Delta D_{50}$ is as follows.

Mode Diameter $D_{st}$

The mode diameter $D_{st}$ is a Stokes' equivalent diameter providing the mode of aggregate size distribution in the curve corresponding to the Stokes' equivalent diameter of the aggregate and the frequency.

Half-Value Breadth $\Delta D_{50}$

The half-value breadth $\Delta D_{50}$ is the breadth of distribution when the frequency is half of the maximum height in the curve corresponding to the Stokes' equivalent diameter of the aggregate and the frequency.

(3) 24M4 DBP

The 24M4 DBP absorbed amount (cm$^3$/100 g) was measured in accordance with ISO 6894.

(4) CTAB Specific Surface Area

The CTAB specific surface area (m$^2$/g) was measured in accordance with ISO 6810.

(5) N$_2$SA (Nitrogen Adsorption Specific Surface Area)

N$_2$SA (m$^2$/g) was measured in accordance with ASTM D3037-88.

Various properties of the tire were evaluated by the following measuring methods.

Abrasion Resistance Index

The truck tire prepared as described later was mounted to a vehicle, and then the loss of the tread of the tire once the car traveled 40,000 km was measured. The abrasion resistance index was expressed with an index of 100 representing the inverse of the loss of the tread of Comparative Example 1, 6, or 7. The larger index value means excellent abrasion resistance.

Rolling Resistance Index

The truck tire prepared as described later is freely rotated on the drum to measure the rolling resistance. The rolling resistance index was expressed with an index of 100 representing the rolling resistance of Comparative Example 1, 6, or 7. The smaller index value means excellently low rolling resistance.

Factory Processability Index

The Mooney viscosity ($ML_{1+4}$) of the sample of the unvulcanized rubber composition was measured at 130° C. in accordance with JIS K6300. The factory processability index was expressed with an index of 100 representing the Mooney viscosity of Comparative Example 1, 6, or 7. The smaller index value means excellently low viscosity.

Examples 1 to 7

Preparation of Carbon Black

The carbon black production furnace shown in FIG. 1 was used to produce carbon blacks A to G. A three stage quenching medium-introducing means comprising a first quenching medium-introducing means 12-X, a second quenching medium-introducing means 12-Y and a final quenching medium-introducing means 12-Z was used as a multistage quenching medium-introducing means 12 in FIG. 1.

Also, used was the carbon black production furnace described above assuming a structure in which thermocouples could be inserted into the furnace at optional several spots in order to monitor a temperature of the furnace. In the carbon black production furnace, an A heavy oil having a specific density of 0.8622 (15° C./4° C.) was used for a fuel, and a heavy oil having properties shown in Table 1 was used for feedstock. Operating conditions of the carbon black production furnace is shown in Table 2. The results of the above-mentioned measurements of these carbon blacks were shown in Table 3.

TABLE 1

| Table 1 | | |
|---|---|---|
| Specific gravity (JIS K2249) (15/4° C.) | | 1.1319 |
| Heavy viscosity (JIS K2283) (mm$^2$/s at 50° C.) | | 26.7 |
| Water content (JIS K2275) (%) | | 0.5 |
| Carbon residue (JIS K2210) (%) | | 11.6 |
| Sulfur content (JIS K2213) (%) | | 0.4 |
| Carbon content (%) | | 90.1 |
| Hydrogen content (%) | | 5.4 |
| BMC I[*1] | | 160 |
| Distillation characteristics (° C.) | I.B.P.[*2] | 188 |
| | 10% boiling point | 234 |
| | 30% boiling point | 291 |
| | 50% boiling point | 360 |

[*1] BMC I: Bureau of Mines Correlation Index (U.S. Bureau of Mines index)
[*2] I.B.P.: Initial Boiling Point

TABLE 2

|  |  | Type of carbon black | | | | | | | | |
|---|---|---|---|---|---|---|---|---|---|---|
|  |  | A | B | C | D | E | F | G | H | I |
| Conditions of oil introduction | Introduction amount (kg/hr) | 290 | 310 | 390 | 410 | 320 | 298 | 325 | 412 | 500 |
|  | Preheating temperature (° C.) | 229 | 242 | 321 | 315 | 311 | 314 | 312 | 300 | 305 |
| Conditions of air introduction | Total amount of air introduction (kg/hr) | 1142 | 1345 | 1720 | 1720 | 1314 | 1170 | 1280 | 1760 | 1720 |
|  | Preheating temperature (° C.) | 715 | 727 | 782 | 778 | 730 | 765 | 762 | 710 | 740 |
| Fuel introduction amount (kg/hr) | | 59 | 70 | 79 | 79 | 70 | 56 | 78 | 86 | 80 |
| Amount of cooling water (L/h) | | 282 | 150 | 140 | 140 | 150 | 132 | 372 | 200 | 100 |
| Reaction time (milli-second) | | 93.6 | 11.2 | 13.1 | 13.1 | 11.2 | 45.5 | 41.6 | 155.6 | 243.6 |

TABLE 3

|  |  |  |  | Example | | | | | |
|---|---|---|---|---|---|---|---|---|---|
|  |  |  |  | 1 | 2 | 3 | 4 | 5 | 6 |
| Carbon black | Type of carbon black | | | A | B | C | D | E | F |
|  | Formulation no. (q.v. Table 6) | | | 1 (50) | 1 (50) | 1 (50) | 1 (50) | 1 (50) | 1 (50) |
|  | [Blending amount of carbon black (parts by mass)] | | | | | | | | |
|  |  | CTAB | [m$^2$/g] | 102 | 101 | 104 | 97 | 116 | 106 |
|  |  | N$_2$SA | [m$^2$/g] | 111 | 108 | 105 | 95 | 120 | 110 |
|  |  | 24M4DBP | [cm$^3$/100 g] | 112 | 109 | 116 | 113 | 113 | 109 |
|  |  | σ | nm | 87 | 71 | 87 | 91 | 73 | 83 |
|  | Centrifugal sedimentation | Dst | nm | 77 | 75 | 83 | 89 | 67 | 72 |
|  |  | ΔD$_{50}$' | nm | 55 | 45 | 57 | 56 | 46 | 52 |
|  |  | σ' | nm | 88 | 71 | 92 | 89 | 73 | 82 |
|  |  | 24M4DBP/Dst | | 1.45 | 1.45 | 1.40 | 1.27 | 1.69 | 1.51 |
|  |  | Right-hand value of expression (1) | nm | 91 | 91 | 94 | 100 | 80 | 88 |
| Tire | Abrasion resistance index | | | 112 | 112 | 113 | 109 | 108 | 110 |
|  | Rolling resistance index | | | 97 | 98 | 97 | 96 | 99 | 98 |
|  | Factory processability index (Viscosity of unvulcanized rubber) | | | 101 | 101 | 95 | 92 | 102 | 90 |

|  |  |  |  | Example | Comparative Example | | | | |
|---|---|---|---|---|---|---|---|---|---|
|  |  |  |  | 7 | 1 | 2 | 3 | 4 | 5 |
| Carbon black | Type of carbon black | | | G | N234 | N339 | N220 | H | I |
|  | Formulation no. (q.v. Table 6) | | | 1 (50) | 1 (50) | 1 (50) | 1 (50) | 1 (50) | 1 (50) |
|  | [Blending amount of carbon black (parts by mass)] | | | | | | | | |
|  |  | CTAB | [m$^2$/g] | 75 | 114 | 73 | 109 | 96 | 98 |
|  |  | N$_2$SA | [m$^2$/g] | 79 | 126 | 72 | 117 | 102 | 104 |
|  |  | 24M4DBP | [cm$^3$/100 g] | 107 | 102 | 103 | 100 | 114 | 114 |
|  |  | σ | nm | 103 | 79 | 108 | 91 | 109 | 131 |
|  | Centrifugal sedimentation | Dst | nm | 95 | 60 | 93 | 65 | 84 | 71 |
|  |  | ΔD$_{50}$' | nm | 57 | 44 | 66 | 49 | 70 | 51 |
|  |  | σ' | nm | 90 | 71 | 105 | 77 | 111 | 82 |
|  |  | 24M4DBP/Dst | | 1.13 | 1.70 | 1.11 | 1.54 | 1.36 | 1.60 |
|  |  | Right-hand value of expression (1) | nm | 107 | 79 | 108 | 87 | 96 | 84 |
| Tire | Abrasion resistance index | | | 80 | 100 | 70 | 95 | 91 | 95 |
|  | Rolling resistance index | | | 76 | 100 | 77 | 98 | 103 | 104 |
|  | Factory processability index (Viscosity of unvulcanized rubber) | | | 85 | 100 | 86 | 90 | 101 | 106 |

Preparation of Rubber Composition

Each of the above-mentioned carbon blacks and various components were blended in the blending recipe of the formulation 1 shown in Table 6 and mixed by using a Banbury mixer to prepare a rubber composition.

Preparation of Truck Tire

Each of the above-mentioned rubber compositions was used as the rubber composition for a tread, and then a truck tire with a size of 11R22.5 was produced experimentally. The results of the above-mentioned evaluations of the tires are shown in Table 3.

Comparative Examples 1 to 3

The above-mentioned measurements of the following commercially available carbon blacks were conducted. The results are shown in Table 3.

N234: trade name: "SIEST 7HM" (available from TOKAI CARBON Co., Ltd.)

N339: trade name: "SIEST KH" (available from TOKAI CARBON Co., Ltd.)

N220: trade name: "SIEST 6" (available from TOKAI CARBON Co., Ltd.)

Except for using these commercially available carbon blacks, rubber compositions and truck tires were prepared in the same manner as Example 1. The results of the above-mentioned evaluations of the rubber compositions and the tires are shown in Table 3.

Comparative Examples 4 to 5

The carbon blacks H and I were prepared in the same way as the carbon blacks A to G. Operating conditions of the carbon black production furnace is shown in Table 2. By using the carbon blacks H and I, rubber compositions and truck tires were prepared in the same manner as Example 1. The results of the above-mentioned evaluations of the carbon blacks H and I, the rubber compositions, and the truck tires are shown in Table 3.

Example 8 and Comparative Example 6

The carbon black A and the carbon black N234 were used as Example 8 and Comparative Example 6, respectively, and then various components were blended in the blending recipe of the formulation 2 shown in Table 6 and mixed by using a Banbury mixer to prepare rubber compositions. These two kinds of rubber compositions each were used as the rubber composition for a tread, and then the truck tires with a size of 11R22.5 were produced experimentally. The results of the above-mentioned evaluations of the tires are shown in Table 4.

TABLE 4

Table 4

|  |  | Example 8 | Comparative Example 6 |
|---|---|---|---|
| Type of carbon black |  | A | N234 |
| Formulation no. (q.v. Table 6) [Blending amount of carbon black (parts by mass)] |  | 2 (30) | 2 (30) |
| Tire | Abrasion resistance index | 118 | 100 |
|  | Rolling resistance index | 97 | 100 |
|  | Factory processability index (Viscosity of unvulcanized rubber) | 100 | 100 |

Example 9 and Comparative Example 7

The carbon black A and the carbon black N234 were used as Example 9 and Comparative Example 7, respectively, and then various components were blended in the blending recipe of the formulation 3 shown in Table 6 and mixed by using a Banbury mixer to prepare rubber compositions. These two kinds of rubber compositions each were used as the rubber composition for a tread, and then the truck tires with a size of 11R22.5 were produced experimentally. The results of the above-mentioned evaluations of the tire are shown in Table 5.

TABLE 5

Table 5

|  |  | Example 9 | Comparative Example 7 |
|---|---|---|---|
| Type of carbon black |  | A | N234 |
| Formulation no. (q.v. Table 6) [Blending amount of carbon black (parts by mass)] |  | 3 (80) | 3 (80) |

TABLE 5-continued

Table 5

|  |  | Example 9 | Comparative Example 7 |
|---|---|---|---|
| Tire | Abrasion resistance index | 111 | 100 |
|  | Rolling resistance index | 97 | 100 |
|  | Factory processability index (Viscosity of unvulcanized rubber) | 101 | 100 |

TABLE 6

Table 6

| | Blending amount (parts by mass) | | |
|---|---|---|---|
| | Formulation 1 | Formulation 2 | Formulation 3 |
| Natural rubber | 100 | 100 | 100 |
| Carbon black | 50 | 30 | 80 |
| Stearic acid | 3 | 3 | 3 |
| Zinc oxide | 5 | 5 | 5 |
| Vulcanization accelerator (Note 1) | 1 | 1 | 1 |
| Sulfur | 1.5 | 1.5 | 1.5 |

(Note 1):
N-t-butyl-2-benzothiazolyl sulfenamide

Result

Figure 2:
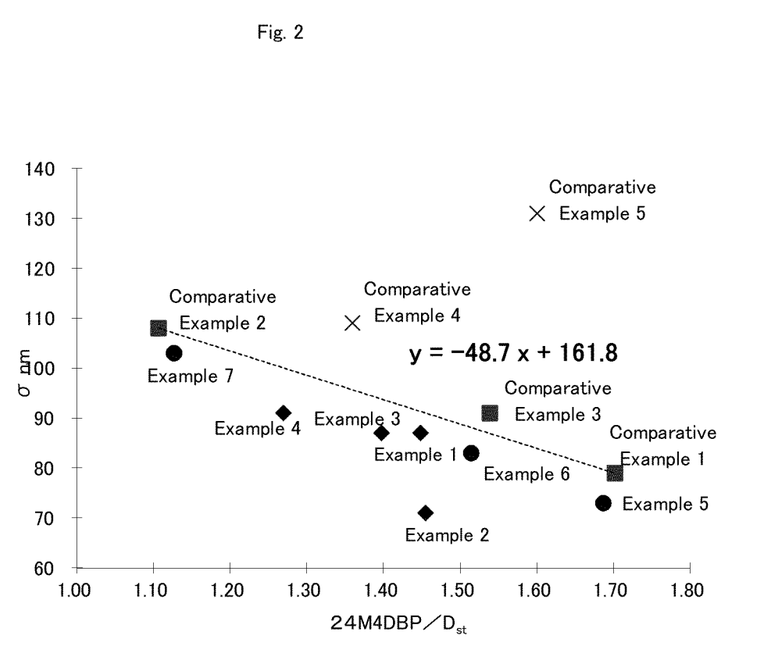
FIG. 2 shows a graph illustrating the relationship between 24M4 DBP/$D_{st}$ and σ obtained by a light scattering method in the examples and the comparative examples.
Figure 3:
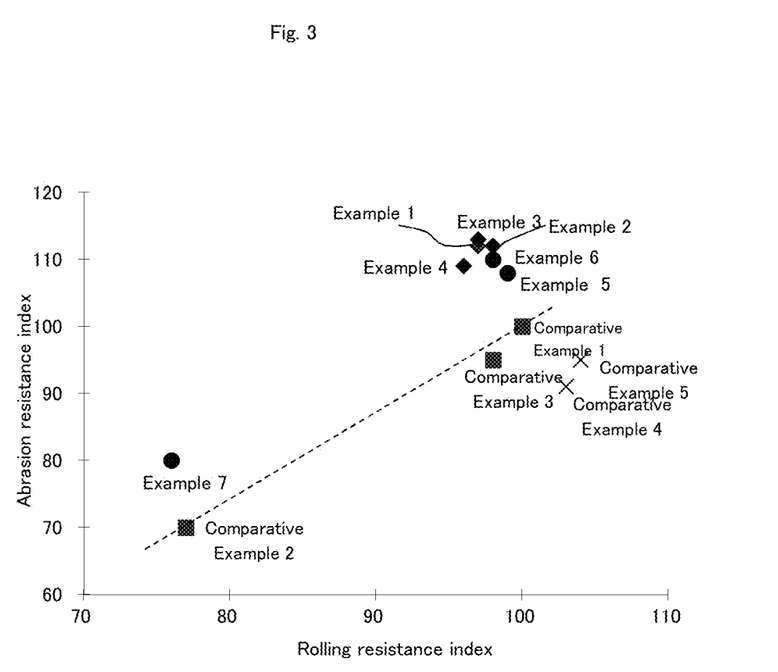
FIG. 3 shows a graph illustrating the relationship between the rolling resistance index and the abrasion resistance index in the examples and the comparative examples.

FIG. 2 shows a graph illustrating the relationship between 24M4 DBP/$D_{st}$ and σ obtained by a light scattering method. FIG. 3 shows a graph illustrating the relationship between the rolling resistance index and the abrasion resistance index obtained by a light scattering method.

As described below, FIGS. 2 and 3 have a definite connection. Clearly, preparing carbon black to satisfy the above-mentioned expression (1) can achieve both abrasion resistance and rolling resistance.

The dotted straight line in FIG. 2 (light scattering method) connects the carbon black of Comparative Example 1 (trade name: "SIEST 7HM" (available from TOKAI CARBON Co., Ltd.) with the carbon black of Comparative Example 2 (trade name: "SIEST KH" (available from TOKAI CARBON Co., Ltd.). These carbon blacks are generally known to have excellent abrasion resistance and excellent low rolling resistance. The dotted straight line in FIG. 2 (light scattering method) shows the expression in which the inequality sign "<" of the expression (1) is substituted with the equality sign "=."

As shown in FIG. 2 (light scattering method), all the carbon blacks of Examples 1 to 7 are located below this straight line and therefore satisfy the expression (1). In the graph shown in FIG. 3, all the tires formed by using the carbon blacks of Examples 1 to 7 are located above this straight line connecting Comparative Example 1 with Comparative Example 2. Therefore, clearly Examples 1 to 7 achieve more excellent both abrasion resistance and excellent low rolling resistance compared with Comparative Examples 1 and 2.

In the graph of FIG. 3, the straight line passing Comparative Examples 1 and 2 is represented by the following expression (4).

$$y=1.30x-30.4 \quad (4)$$

Example 5 is the most closest to this straight line among Examples 1 to 7. When this straight line is translated upward to pass Example 5, the y-intercept of the straight line after the translation is −21.1 and has a difference of 9.3 from the y-intercept (−30.4) of the straight line (of the expression (4))

before the translation. Therefore, in Example 5, the abrasion resistance index is more than only 9.3 points over the straight line represented by the expression (4). This means that the carbon black of Example 5 achieves both abrasion resistance and low rolling resistance more than only an abrasion resistance index difference of 9.3 points compared with those of Comparative Examples 1 and 2 located on the straight line of the expression (4). Therefore, the carbon blacks of Examples 1 to 7 achieve both abrasion resistance and low rolling resistance more than an abrasion resistance index difference of 9.3 or more points compared with those of Comparative Examples 1 and 2.

When this abrasion resistance index difference is 3 or more points, both abrasion resistance and low rolling resistance can be considered to be achieved compared with Comparative Examples 1 and 2.

On the other hand, all the carbon blacks of Comparative Examples 3 to 6 are located above the straight line in FIG. 2 (light scattering method) and therefore do not satisfy the expression (1). In the graph shown in FIG. 3, all the carbon blacks of Comparative Examples 3 to 6 are located below this straight line (of the expression (4)) connecting Comparative Example 1 with Comparative Example 2. Therefore, the carbon blacks of Comparative Examples 3 to 6 achieve neither abrasion resistance nor low rolling resistance compared with those of Comparative Examples 1 and 2.

Figure 4:
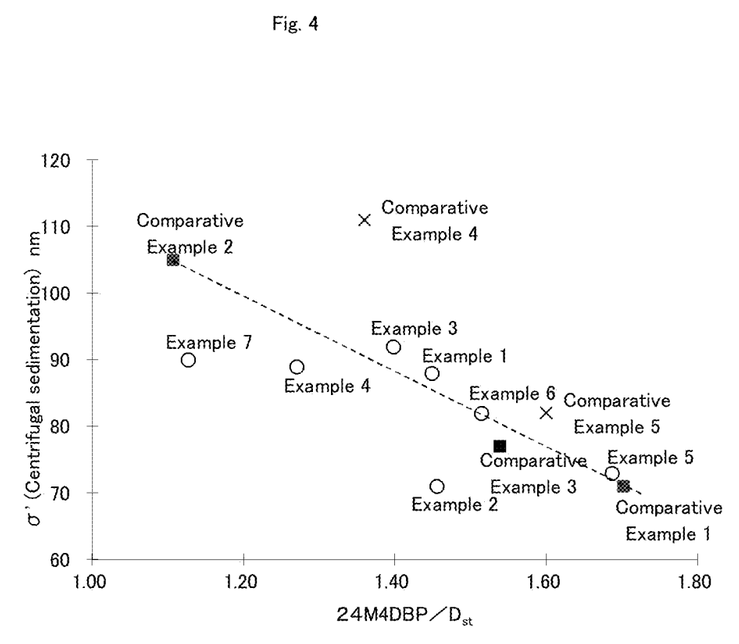
FIG. 4 shows a graph illustrating the relationship between 24M4 DBP/$D_{st}$ and the standard deviation σ' of aggregate size distribution obtained by a centrifugal sedimentation method in the examples and the comparative examples.

FIG. 4 shows a graph illustrating the relationship between 24M4 DBP/$D_{st}$ and σ' obtained by a centrifugal sedimentation method. The dotted straight line in FIG. 4 (centrifugal sedimentation method) connects Comparative Example 1 with Comparative Example 2 in the same manner as FIG. 2 (light scattering method).

Examples 2, 4, and 7 are located below the straight line in FIG. 4 (centrifugal sedimentation method) while Examples 1, 3, 5, and 6 are above. Therefore, even if the aggregate size distribution of carbon black is measured by a centrifugal sedimentation method, clearly no index to show that both abrasion resistance and low rolling resistance are achieved is obtained.

As clearly shown in Tables 4 and 5, even when the blending amount of carbon black is small, specifically, 30 parts by mass, the rubber composition of Example 8 has excellent abrasion resistance and excellent low rolling resistance compared with that of Comparative Example 6. Furthermore, even when the blending amount of carbon black is large, specifically, 80 parts by mass, the rubber composition of Example 9 has excellent abrasion resistance and excellent low rolling resistance compared with the rubber composition of Comparative Example 7.

EXPLANATIONS OF THE CODES

1 Carbon black production furnace
10 Reaction chamber
11 Reaction continuing-cum-cooling chamber
12 Multistage quenching medium-introducing means
12-X First quenching medium-introducing means
12-Y Second quenching medium-introducing means
12-Z Final quenching medium-introducing means

What is claimed is:
1. Carbon black, the standard deviation σ of aggregate size distribution of which is obtained by a light scattering method using an ultraviolet ray, the standard deviation σ satisfying the expression (1):

$$\sigma < -48.7 \times (24M4DBP/D_{st}) + 161.8 \quad (1)$$

wherein 24M4DBP represents the dibutyl phthalate absorption number ($cm^3$/100 g) of compressed sample, and $D_{st}$ (nm) is a Stokes' equivalent diameter providing the mode in aggregate size distribution obtained by a centrifugal sedimentation method;
wherein 24M4DBP is 106 to 120 $cm^3$/100 g;
wherein $1.3 < 24M4DBP/D_{st} < 1.5$; and
wherein 70 < CTAB specific surface area ($m^2$/g) < 105.
2. The carbon black according to claim 1, wherein the half-value breadth $\Delta D_{50}$ (nm) of the peak including the $D_{st}$ of the aggregate size distribution and the $D_{st}$ (nm) are $\Delta D_{50} < 100$ and $D_{st} < 115$ respectively.
3. A rubber composition comprising 5 to 200 parts by mass of the carbon black according to claim 1 mixed based on 100 parts by mass of a rubber component.
4. A pneumatic tire formed by using the rubber composition according to claim 3.

* * * * *